(12) United States Patent
Fujimatsu

(10) Patent No.: US 12,088,083 B2
(45) Date of Patent: Sep. 10, 2024

(54) PROTECTIVE CIRCUIT EQUIPPED WITH A REFLUX CIRCUIT AND A SWITCHING CIRCUIT AND ENERGY STORAGE APPARATUS CONTAINING THE PROTECTIVE CIRCUIT

(71) Applicant: GS Yuasa International Ltd., Kyoto (JP)

(72) Inventor: Masakatsu Fujimatsu, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 203 days.

(21) Appl. No.: 17/756,447

(22) PCT Filed: Dec. 2, 2020

(86) PCT No.: PCT/JP2020/044770
§ 371 (c)(1),
(2) Date: May 25, 2022

(87) PCT Pub. No.: WO2021/117566
PCT Pub. Date: Jun. 17, 2021

(65) Prior Publication Data
US 2022/0416533 A1    Dec. 29, 2022

(30) Foreign Application Priority Data
Dec. 10, 2019 (JP) .................................. 2019-222967

(51) Int. Cl.
*H02H 3/18* (2006.01)
*H02H 1/00* (2006.01)

(52) U.S. Cl.
CPC ............ *H02H 3/18* (2013.01); *H02H 1/0007* (2013.01)

(58) Field of Classification Search
CPC .. H02J 7/00309; H02J 7/0031; H02H 1/0007; H02H 3/18; H02H 7/18
See application file for complete search history.

(56) References Cited

U.S. PATENT DOCUMENTS

| 11,228,305 B2 * | 1/2022 | Nouda .................. H03K 17/08 |
| 2010/0208401 A1 | 8/2010 | Kimoto |

(Continued)

FOREIGN PATENT DOCUMENTS

| JP | S51-020684 B1 | 6/1976 |
| JP | 2002-064933 A | 2/2002 |

(Continued)

OTHER PUBLICATIONS

International Search Report and Written Opinion for International Application No. PCT/JP2020/044770, dated Mar. 9, 2021, (8 pages), Japan Patent Office, Tokyo, Japan.

*Primary Examiner* — Jared Fureman
*Assistant Examiner* — Nicolas Bellido
(74) *Attorney, Agent, or Firm* — Alston & Bird LLP

(57) ABSTRACT

A protection circuit 100 of an energy storage apparatus 20 equipped with external terminals 58A, 58B, the protection circuit 100 being equipped with a reflux circuit 110 connected in parallel to a load 12 connected between the external terminals, and also equipped with a switching circuit 120, wherein: the reflux circuit 110 is equipped with a reflux element 111 which causes an induced current produced when the current to the load 12 is blocked to return to the load 12, and a semiconductor switch 115 which is connected in series to the reflux element 111; and the switching circuit 120 switches the semiconductor switch 115 from conducting to blocking after a delay of a prescribed interval from when a reverse voltage is applied to the external terminals 58A, 58B.

2 Claims, 8 Drawing Sheets

(56) References Cited

U.S. PATENT DOCUMENTS

| | | | |
|---|---|---|---|
| 2012/0306507 A1* | 12/2012 | Fujimatsu | G01R 31/396 |
| | | | 324/434 |
| 2018/0041055 A1* | 2/2018 | Nakamoto | H01M 10/482 |
| 2019/0031126 A1 | 1/2019 | Kawauchi | |
| 2020/0366278 A1 | 11/2020 | Nouda et al. | |
| 2021/0384720 A1* | 12/2021 | Li | B60L 50/66 |
| 2022/0166234 A1* | 5/2022 | Hattori | H02H 7/18 |
| 2022/0200307 A1* | 6/2022 | Dono | H01M 50/583 |
| 2022/0200328 A1* | 6/2022 | Matsuda | H02H 3/08 |

FOREIGN PATENT DOCUMENTS

| | | | |
|---|---|---|---|
| JP | 2003-037933 A | | 2/2003 |
| JP | 2010-011598 A | | 1/2010 |
| JP | 2010-044521 A | | 2/2010 |
| JP | 2011-135633 A | | 7/2011 |
| JP | 2014-236555 A | | 12/2014 |
| JP | 2017-136901 A | | 8/2017 |
| JP | 2017-200308 A | | 11/2017 |
| JP | 2018007090 A | * | 1/2018 |
| JP | 2019-103063 A | | 6/2019 |

* cited by examiner

PROTECTIVE CIRCUIT EQUIPPED WITH A REFLUX CIRCUIT AND A SWITCHING CIRCUIT AND ENERGY STORAGE APPARATUS CONTAINING THE PROTECTIVE CIRCUIT

CROSS REFERENCE TO RELATED APPLICATIONS

This application is a national stage application, filed under 35 U.S.C. § 371, of International Application No. PCT/JP2020/044770, filed Dec. 2, 2020, which claims priority to Japanese Application No. JP 2019-222967, filed Dec. 10, 2019, the contents of both of which as are hereby incorporated by reference in their entireties.

BACKGROUND

Technical Field

The technology disclosed in the present specification relates to a protective circuit and an energy storage apparatus.

Description of Related Art

Some energy storage apparatuses cut off current to a load when an abnormality is caused. As a document related to this type of technology, the following one is known: JP-A-2017-136901.

BRIEF SUMMARY

Because an inductive load generates an induced current when current is cut off, it is conceivable to provide a reflux element that refluxes the induced current to the load in order to protect the energy storage apparatus. However, when a charger or an external power supply is reversely connected to external terminals of the energy storage apparatus, the current may continue to flow through the reflux element, and sometimes the reflux element is damaged by abnormal heat generation.

The present specification discloses a technique capable of preventing the damage to the reflux element even when the charger or the external power supply is reversely connected to the external terminals of the energy storage apparatus.

A protective circuit of an energy storage apparatus including external terminals includes: a reflux circuit connected in parallel to a load connected between the external terminals; and a switching circuit. The reflux circuit includes: a reflux element that refluxes an induced current, which is generated when current to a load is cut off, to the load; and a current cutoff unit connected in series to the reflux element, and the switching circuit switches the current cutoff unit from conduction to cutoff while delaying the current cutoff unit by a predetermined time from a time point when a reverse voltage is applied to the external terminals.

This technique can be used while being mounted on the energy storage apparatus.

According to the above technique, when the charger or the external power supply is reversely connected to the external terminals of the energy storage apparatus, the reflux element can be prevented from abnormally generating heat by cutting off the current after a predetermined time.

DETAILED DESCRIPTION OF VARIOUS EMBODIMENTS

Outline of Embodiment

Figure 1:
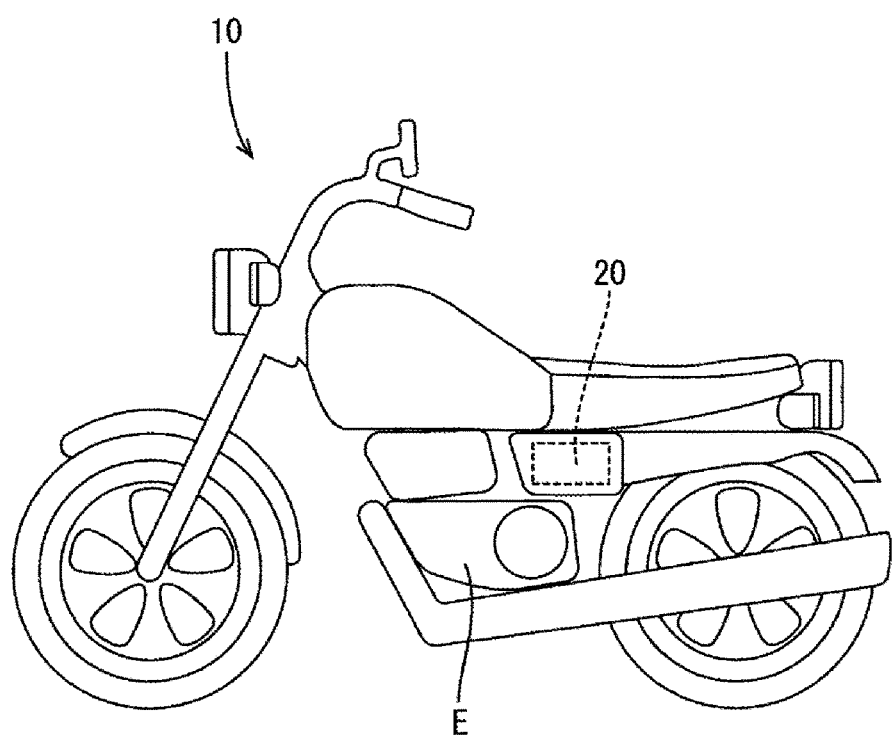
FIG. 1 is a side view illustrating a motorcycle according to a first embodiment.

A protective circuit of an energy storage apparatus including external terminals, the protective circuit includes: a reflux circuit connected in parallel to a load connected between the external terminals; and a switching circuit. The reflux circuit includes: a reflux element that refluxes an induced current, which is generated when current to the load is cut off, to the load; and a current cutoff unit connected in series to the reflux element, and the switching circuit switches the current cutoff unit from conduction to cutoff while delaying the current cutoff unit by a predetermined time from a time point when a reverse voltage is applied to the external terminals.

In this configuration, the induced current generated when the current to the load is cut off is refluxed to the load using the reflux circuit. Consequently, the energy storage apparatus can be protected from the induced current (surge). In the case where the charger or the external power supply is reversely connected to the external terminals, when the predetermined time (delay time) elapses from the reverse connection, the current cutoff unit is switched from conduction to cutoff. Consequently, even when the reverse connection is generated, the current is cut off after the delay time elapses. Therefore, a breakdown of the reflux element due to abnormal heat generation can be prevented.

The current cutoff unit may be a semiconductor switch. The semiconductor switch has a shorter time from reception of the cutoff command to the cutoff of the current as compared with a mechanical switch, and has an excellent response. Consequently, the reflux element hardly generates the abnormal heat because of excellent current cutoff performance.

The switching circuit may include a capacitance unit existing between a gate and a source of the semiconductor switch, and the capacitance unit may be discharged from the time point when the reverse voltage is applied to the external terminals to switch the semiconductor switch from on to off while delayed by a predetermined time from the time point when the reverse voltage is applied. In this configuration, a delay time of the semiconductor switch can be produced using the capacitance unit existing between the source and the gate of the semiconductor switch. The semiconductor switch is switched from on to off by not a signal from a controller included in the energy storage apparatus or the like but an analog circuit including the capacitance unit. Consequently, for example, even when the controller is not operating due to overdischarge of the energy storage device in the energy storage apparatus, the semiconductor switch can be properly operated.

The switching circuit may include a first resistor, the capacitance unit, a diode connected in parallel to the capacitance unit, and a second resistor, in the first resistor, one end may be connected to the external terminal of a positive electrode and the other end may be connected to a gate of the semiconductor switch, in the capacitance unit and the diode, one end may be connected to a source of the semiconductor switch and the other may be connected to the gate of the semiconductor switch, and in the second resistor, one end may be connected to the external terminal of the negative electrode and the other end may be connected to the source of the semiconductor switch. In this configuration, an RC delay circuit can be configured of the first resistor and the capacitance unit, and the switching circuit can be configured only of the resistor, the capacitance unit, and the diode.

First Embodiment

A first embodiment will be described with reference to FIGS. 1 to 9. FIG. 1 is a perspective view of a motorcycle 10. An energy storage apparatus 20 can be used for the motorcycle.

1. Configuration of Energy Storage Apparatus 20

Figure 2:
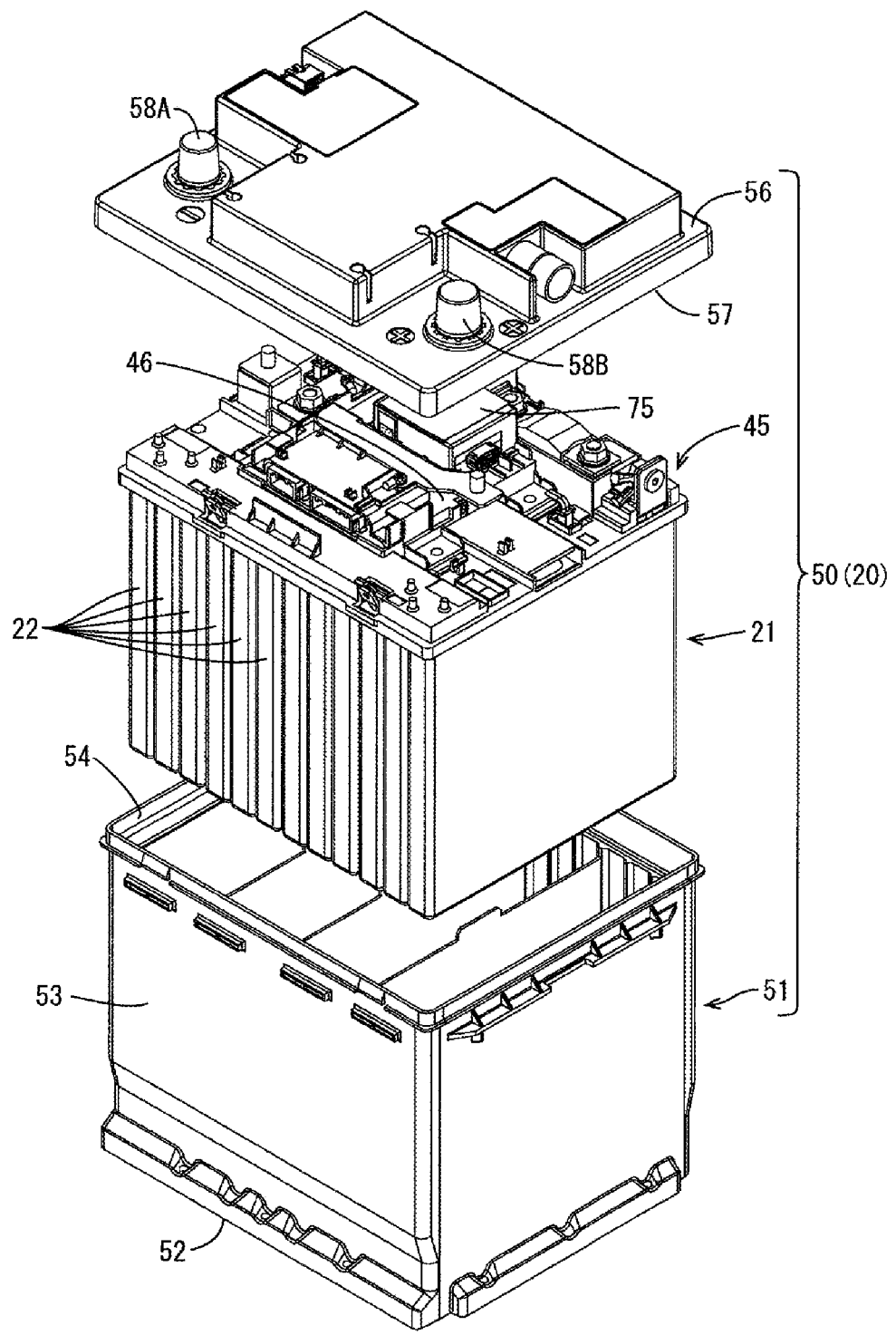
FIG. 2 is an exploded perspective view of an energy storage apparatus.

As illustrated in FIG. 2, the energy storage apparatus 20 includes an assembled battery 21, a circuit board unit 45, and a container 50. The container 50 includes a main body 51 and a lid body 56 that are made of a synthetic resin material. The main body 51 has a bottomed cylindrical shape. The main body 51 includes a bottom surface 52 and four side surfaces 53. An upper opening 54 is formed at an upper end portion by the four side surfaces 53.

The container 50 accommodates the assembled battery 21 and the circuit board unit 45. The circuit board unit 45 includes a circuit board 46 and an electronic component mounted on the circuit board 46, and is disposed on the assembled battery 21. The lid body 56 closes the upper opening 54 of the main body 51. A peripheral wall 57 is provided around the lid body 56. A columnar positive electrode terminal 35A and a columnar negative electrode terminal 35B are fixed to the lid body 56.

Figure 4:
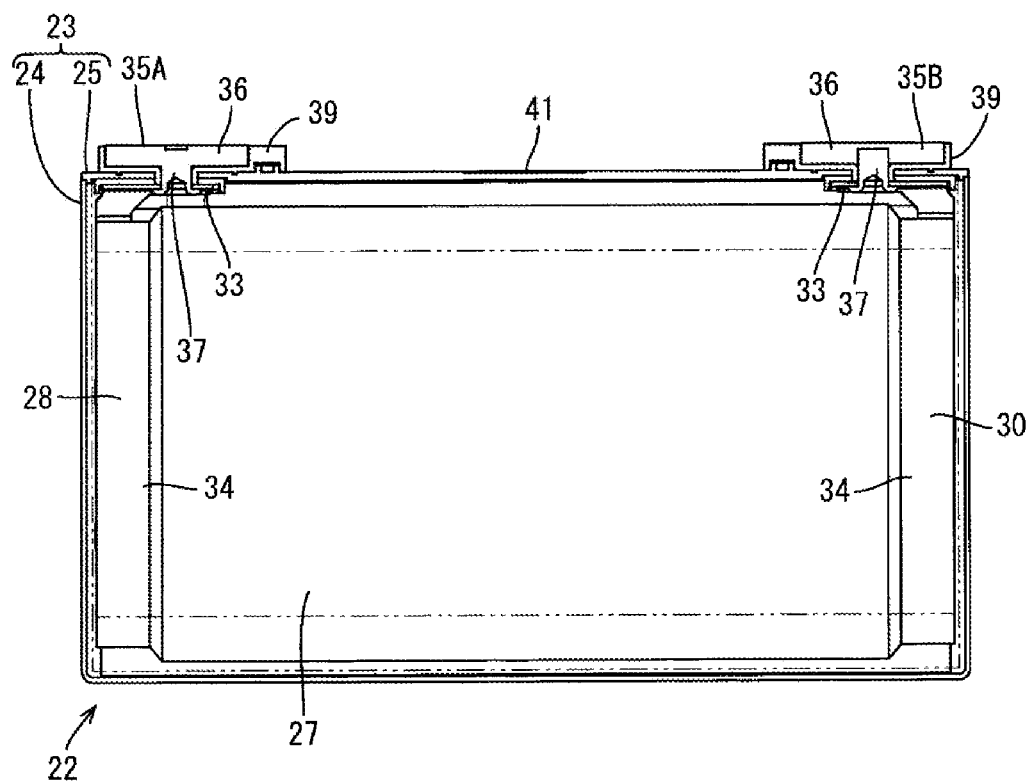
FIG. 4 is a sectional view taken along line A-A of FIG. 3.

The assembled battery 21 includes a plurality of battery cells 22 (energy storage devices). As illustrated in FIG. 4, the battery cell 22 may be one in which an electrode assembly 27 is accommodated in a rectangular parallelepiped case 23 together with a nonaqueous electrolyte. The battery cell 22 may be a lithium ion secondary battery cell. The case 23 includes a case body 24 and a lid 25 that closes an opening above the case body 24.

Although not illustrated in detail, in the electrode assembly 27, a separator formed of a porous resin film is disposed between a negative electrode element in which an active material is applied to a base material formed of a copper foil and a positive electrode element in which an active material is applied to a base material formed of an aluminum foil. These are wound in a flat shape so as to be accommodated in the case body 24 in the state where the negative electrode element and the positive electrode element are displaced to opposite sides in the width direction while the positions are disposed with respect to the separator.

Figure 3:
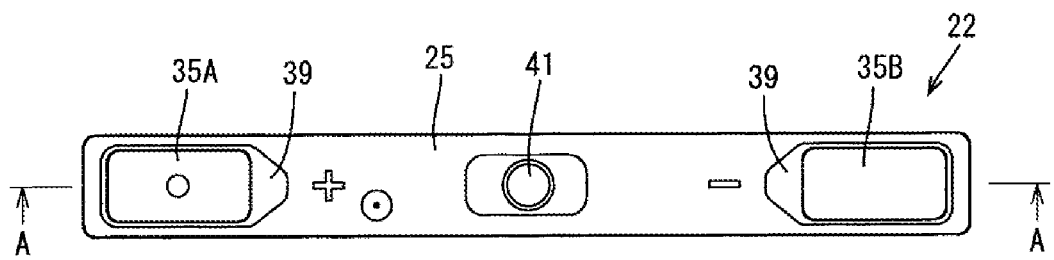
FIG. 3 is a plan view of a secondary battery.

A positive electrode terminal 35A is connected to the positive electrode element through a positive electrode current collector 28, and a negative electrode terminal 35B is connected to the negative electrode element through a negative electrode current collector 30. Each of the positive electrode current collector 28 and the negative electrode current collector 30 includes a flat plate-shaped pedestal 33 and a leg 34 extending from the pedestal 33. A through-hole is made in the pedestal 33. The leg 34 is connected to the positive electrode element or the negative electrode element. Each of the positive electrode terminal 35A and the negative electrode terminal 35B includes a terminal body 36 and a shaft 37 protruding downward from a center portion of a lower surface of the terminal body 36. Among them, the terminal body 36 and the shaft 37 of the positive electrode terminal 35A are integrally formed of aluminum (single material). In the negative electrode terminal 35B, the terminal body 36 is made of aluminum, and the shaft 37 is made of copper, and the terminal body 36 and the shaft 37 are assembled. The terminal bodies 36 of the positive electrode terminal 35A and the negative electrode terminal 35B are disposed at both ends of the lid 25 through a gasket 39 made of an insulating material, and are exposed outward from the gasket 39. As illustrated in FIG. 3, the lid 25 includes a pressure release valve 41. When internal pressure of the case 23 exceeds a limit value, the pressure release valve 41 is released to lower the internal pressure of the case 23.

2. Electric Configuration of Energy Storage Apparatus 20

Figure 5:
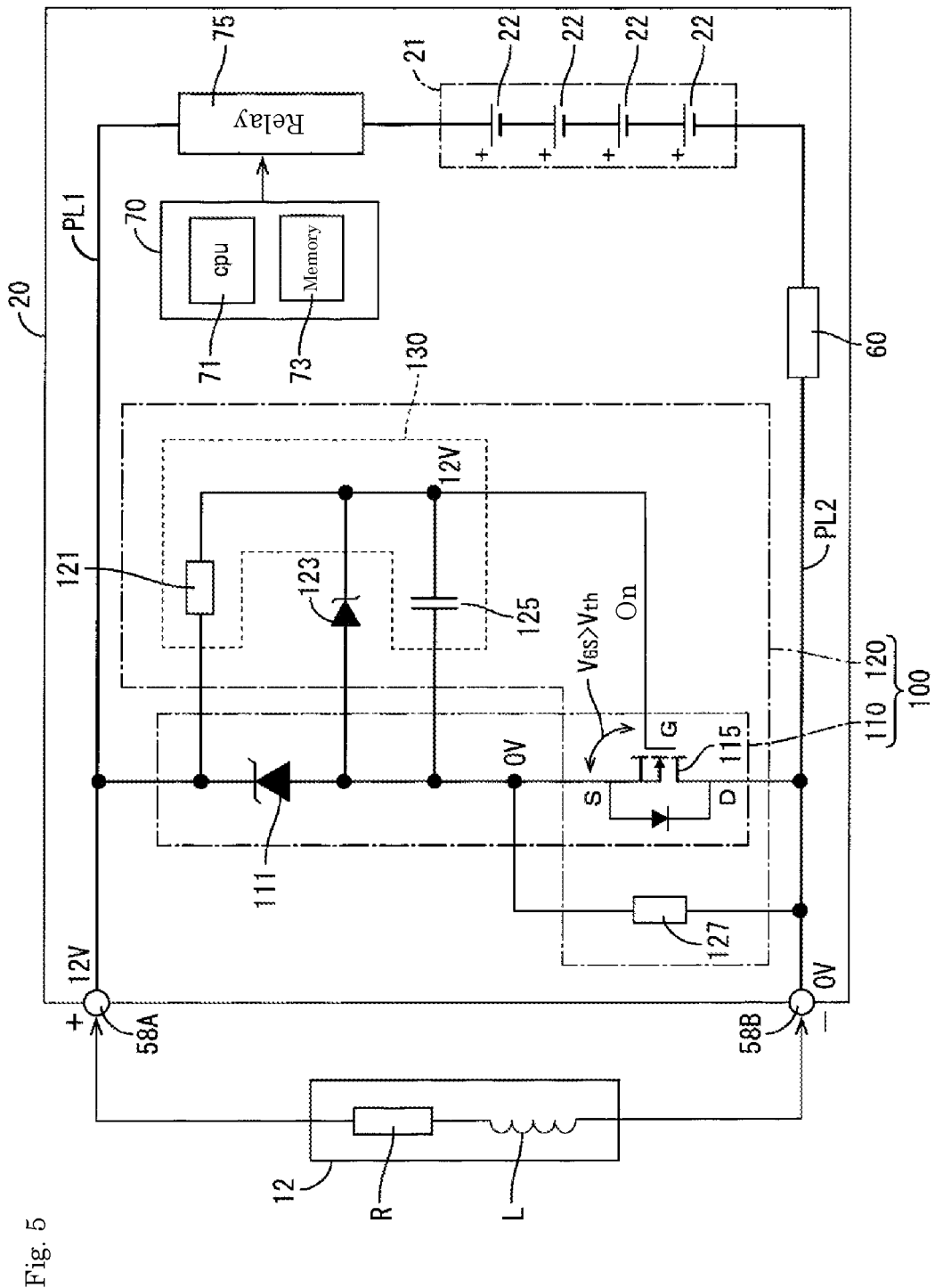
FIG. 5 is a view illustrating an electric configuration of the energy storage apparatus.

FIG. 5 is a block diagram of the energy storage apparatus 20. The energy storage apparatus 20 includes a pair of external terminals 58A and 58B, an assembled battery 21, a current sensor 60, a relay 75, a management device 70, and a protective circuit 100. The assembled battery 21 is configured of a plurality of battery cells 22. The assembled battery 21 has a rated voltage of 12 V.

The external terminal 58A of the positive electrode and the positive electrode of the assembled battery 21, and the external terminal 58B of the negative electrode and the negative electrode of the assembled battery 21 are connected by power lines PL1, PL2 as power supply paths, respectively.

A relay 75 is disposed in the power line PL1 of the positive electrode. The relay 75 is normally closed. The relay 75 is a cutoff device that cuts off the current of the power line PL. Instead of the relay 75, a semiconductor switch such as an FET may be used as the cutoff device. A current sensor 60 that detects current is disposed in the power line PL2 of the negative electrode.

The management device 70 includes a CPU 71 and a memory 73. The management device 70 monitors the state of the assembled battery 21, gives a current cutoff command to the relay 75 when detecting an abnormality, and switches the relay 75 from the closed state to the opened state. Thus, the use of the energy storage apparatus 20 can be prohibited. The abnormality includes an abnormality in current, an abnormality in voltage, an abnormality in temperature, and the like. In addition to the current sensor 60, the energy storage apparatus 20 may include a voltage detection unit that detects the voltage at the assembled battery 21, a temperature sensor that detects the temperature of the assembled battery 21, and the like.

A load 12 is connected to the external terminals 58A, 58B of the energy storage apparatus 20. The load 12 is an inductive load having a resistance component R and an inductance component L. The energy storage apparatus 20 may be for starting an engine. The load 12 may be a starter motor.

3. Configuration of Protective Circuit

For the inductive load 12, induced electromotive force is generated when the current is cut off. The energy storage apparatus 20 includes the protective circuit 100 that protects the energy storage apparatus 20 from the induced electromotive force.

The protective circuit 100 includes a reflux circuit 110 and a switching circuit 120. The reflux circuit 110 is connected in parallel to the load 12 connected between the external terminals 58A, 58B. The reflux circuit 110 includes a reflux element 111 and a semiconductor switch 115.

As an example, the reflux element 111 may be a diode. The reflux element 111 connects a cathode to the external terminal 58A of the positive electrode. In the reflux element 111, a direction from the power line PL2 of the negative electrode toward the power line PL1 of the positive electrode is a forward direction. The reflux element 111 may have a reverse voltage higher than the maximum voltage between the external terminals 58A, 58B so as not to allow the current in the reverse direction to flow at a normal time.

The semiconductor switch 115 may be a field effect transistor (FET). In this example, the FET is an N-channel FET. The semiconductor switch 115 connects a source S to an anode of the reflux element 111, and connects a drain D to the external terminal 58B of the negative electrode. The semiconductor switch 115 is a current cutoff unit that cuts off the current flowing through the reflux element 111. The source S and the drain D are connection terminals of the semiconductor switch.

The switching circuit 120 is a circuit that switches the semiconductor switch 115. The switching circuit 120 includes a first resistor 121, a diode 123, a capacitor 125, and a second resistor 127.

One end of the first resistor 121 is connected to the external terminal 58A of the positive electrode, and the other end is connected to a gate G of the semiconductor switch 115. The gate G is a control terminal of the semiconductor switch. The first resistor 121 may be a high resistor of about 200 [kΩ].

The diode 123 and the capacitor 125 are connected in parallel. One of the diode 123 and the capacitor 125 is connected to the source S of the semiconductor switch 115, and the other is connected to the gate G of the semiconductor switch 115. Capacitance of the capacitor 125 may be about 1000 [pF]. The capacitor 125 is the capacitance unit existing between the gate and the source of the semiconductor switch 115.

In the diode 123, the direction from the source S to the gate G of the semiconductor switch 115 is a forward direction, and the current in the reverse direction is blocked.

One end of the second resistor 127 is connected to the external terminal 58B of the negative electrode, and the other end is connected to the source S of the semiconductor switch 115. The second resistor 127 may be a high resistor of about 100 [kΩ].

4. Description of Operation of Protective Circuit

For the closed relay 75, when the reverse voltage is not applied to the external terminals 58A, 58B, the source S of the semiconductor switch 115 is a reference voltage (0 V in this example), and the gate G is the battery voltage (12 V in this example) of the assembled battery 21 as illustrated in FIG. 5. Consequently, Vgs>threshold voltage Vth, and semiconductor switch 115 is turned on (conductive). Vgs is the voltage of the gate with reference to the source.

Figure 6:
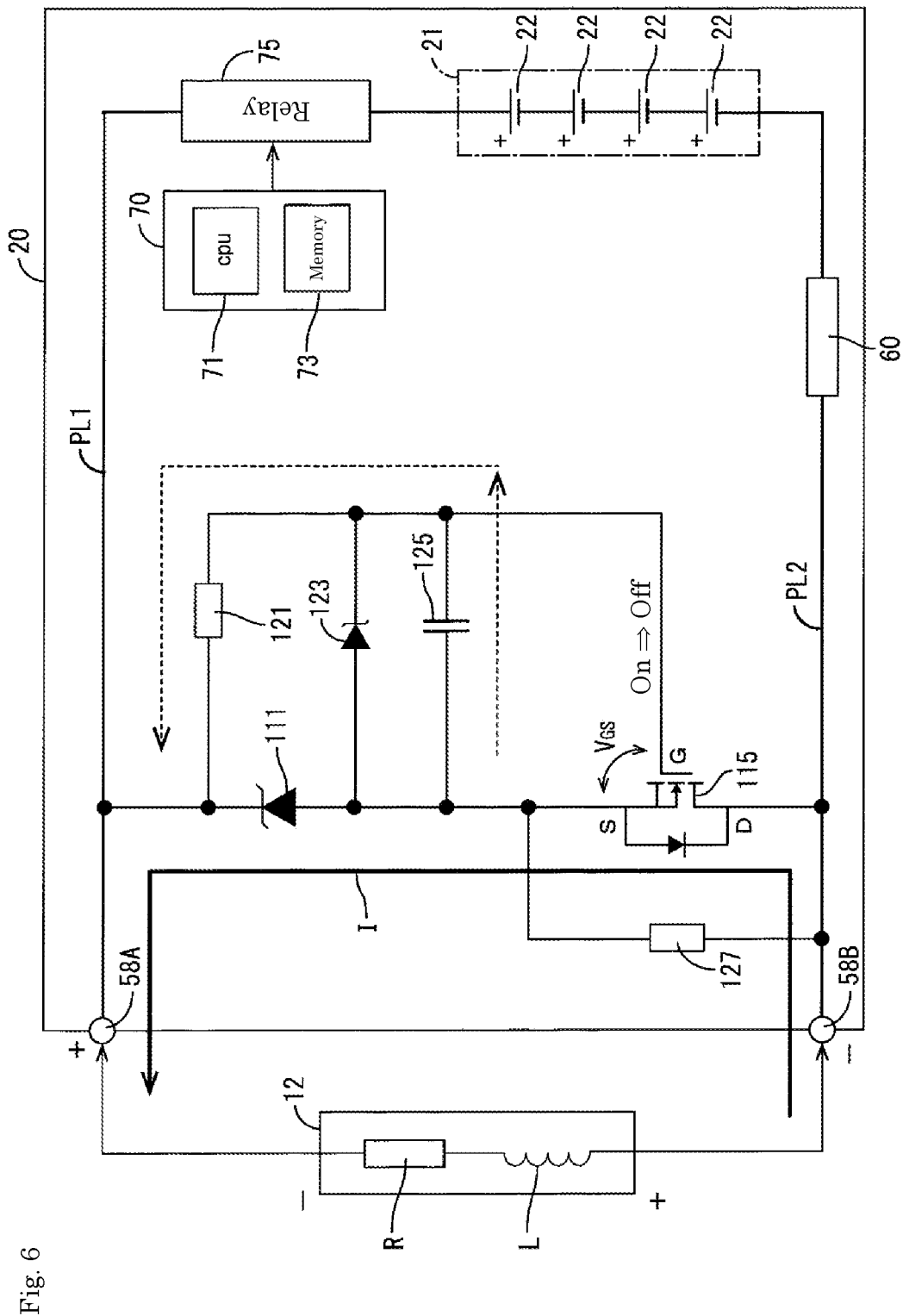
FIG. 6 is a view illustrating a reflux path of an induced current.

When the relay 75 is switched from closed to open to cut off the current of the power line PL, reverse electromotive force is generated in the load 12, and a reverse voltage is applied to the external terminals 58A, 58B of the energy storage apparatus 20 as illustrated in FIG. 6. The reverse voltage is a voltage having a reverse polarity with respect to the assembled battery 21, namely, a voltage that makes the external terminal 58B of the negative electrode positive and makes the external terminal 58A of the positive electrode negative.

The capacitor 125 is connected between the gate G and the source S of the semiconductor switch 115, and is charged to the battery voltage (12 V) by the assembled battery 21 before the generation of the reverse electromotive force.

Immediately after the reverse electromotive force (reverse voltage) is applied to the external terminals 58A, 58B, Vgs at the semiconductor switch 115 is maintained to be higher than the threshold voltage Vth by the capacitor 125, so that the semiconductor switch 115 is maintained at on.

When the semiconductor switch 115 is maintained at on, an induced current I due to the reverse electromotive force flows back to the load 12 through the semiconductor switch 115 and the reflux element 111 as illustrated in FIG. 6. Consequently, the energy storage apparatus 20 can be protected from the induced current (surge) of the load 12.

The capacitor 125 discharges through the first resistor 121 from a time point when the reverse electromotive force is applied, and the voltage decreases. When Vgs at the semiconductor switch 115 decreases to fall below the threshold voltage Vth due to the discharge of the capacitor 125, the semiconductor switch 115 is automatically switched from on to off.

As described above, the capacitor 125 and the first resistor 121 constitute a delay circuit 130 that delays the timing of switching the semiconductor switch 115 from on (conduction) to off (cutoff) by a predetermined time from the time point when the reverse voltage is applied.

The diode 123 connected in parallel to the capacitor 125 serves to maintain Vgs at a negative voltage (breakdown voltage of the diode 123) until the reverse voltage disappears after the semiconductor switch 115 is switched from on to off, thereby maintaining the semiconductor switch 115 off.

Figure 7:
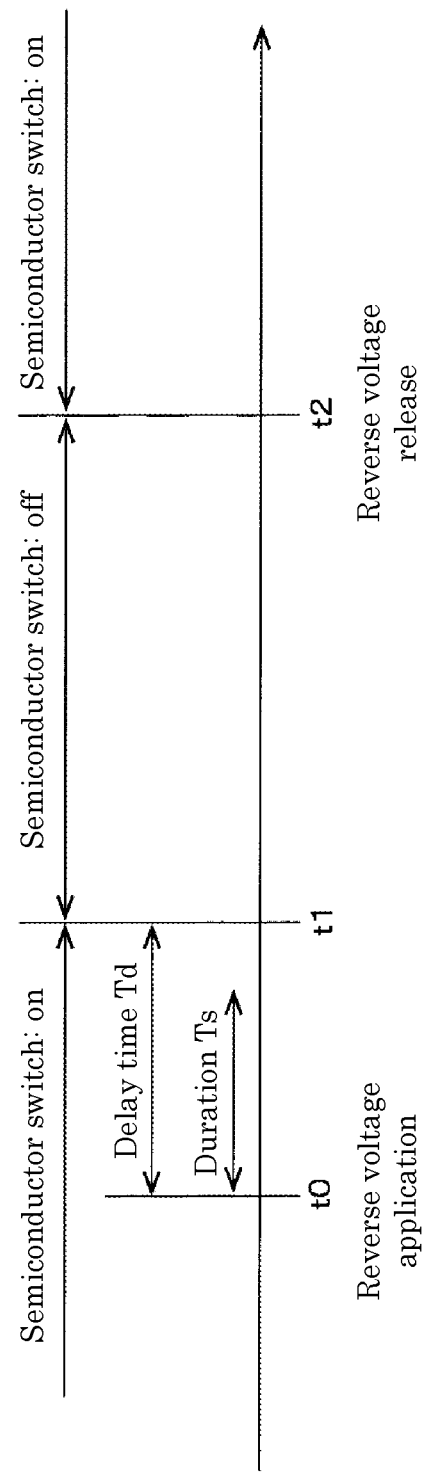
FIG. 7 is a timing chart illustrating on and off of a semiconductor switch.

FIG. 7 is a timing chart illustrating the switching timing of the semiconductor switch 115 when the reverse voltage is applied. A time t0 is the timing at which the reverse voltage is applied, a time t1 is the timing at which the semiconductor switch 115 is switched from on to off, and Td is the delay time.

The delay time Td is determined by a time constant of the RC delay circuit 130 by the first resistor 121 and the capacitor 125, and is preferably at least longer than a duration Ts of the induced current. An experimental value or a theoretical value obtained from a circuit constant may be used as the duration Ts of the induced current. During the continuation of the induced current, the reflux circuit 110 maintains the conduction state by setting the delay time Td to be longer than the duration Ts of the induced current, so that the serge due to the induced current can be return to the load 12.

When the semiconductor switch 115 is automatically switched from on to off (from conduction to cutoff) after the delay time Td elapses, the following effects can be obtained.

Figure 8:
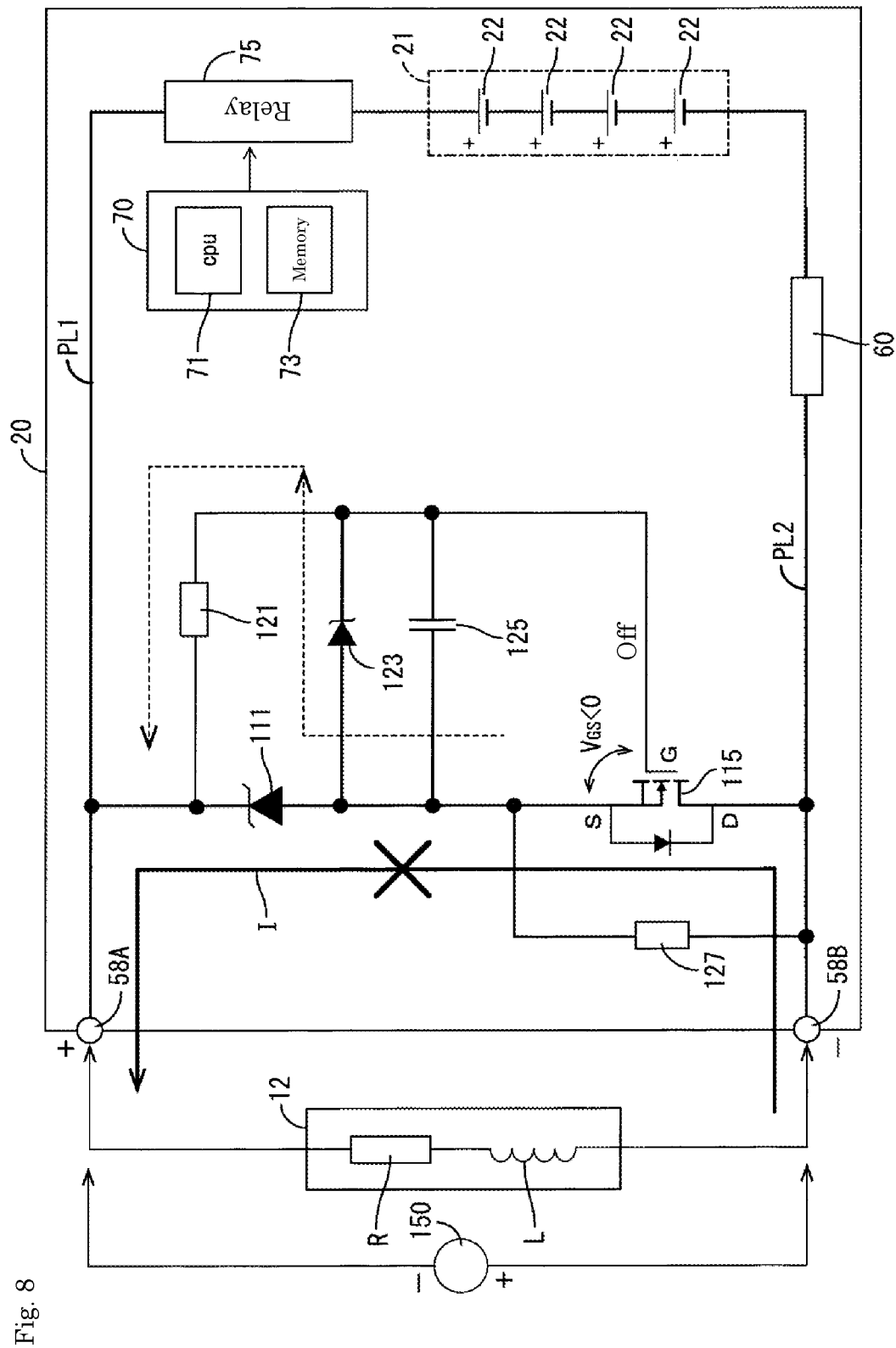
FIG. 8 is a view illustrating a state in which an external power supply is reversely connected.

As illustrated in FIG. 8, the external power supply 150 may be reversely connected to the external terminals 58A, 58B of the energy storage apparatus 20. The reverse connection is a connection in which positive and negative of the polarity are reverse. When the reverse connection is generated, a negative voltage is applied to the external terminal 58A of the positive electrode, and a positive voltage is applied to the external terminal 58B of the negative electrode.

When the reverse connection of the external power supply 150 is generated, the current I continues to flow through the reflux element 111, so that sometimes the reflux element 111 is damaged by the abnormal heat generation. That is, because the surge due to the induction current flows only for a short time of the duration Ts, the reflux element 111 does not abnormally generate heat, but when the external power supply 150 is reversely connected, the current I continues to flow through the reflux element 111, so that sometimes the reflux element 111 is damaged by the abnormal heat generation. A similar problem is concerned not only when the external power supply 150 is reversely connected but also when a charger (not illustrated) is reversely connected.

In this configuration, in the case where the external power supply 150 is reversely connected, the semiconductor switch 115 is switched from on to off when the delay time Td has elapsed from the time of the reverse connection. When the semiconductor switch 115 is switched off, the current I from the external power supply 150 to the reflux element 111 can be cut off.

Figure 9:
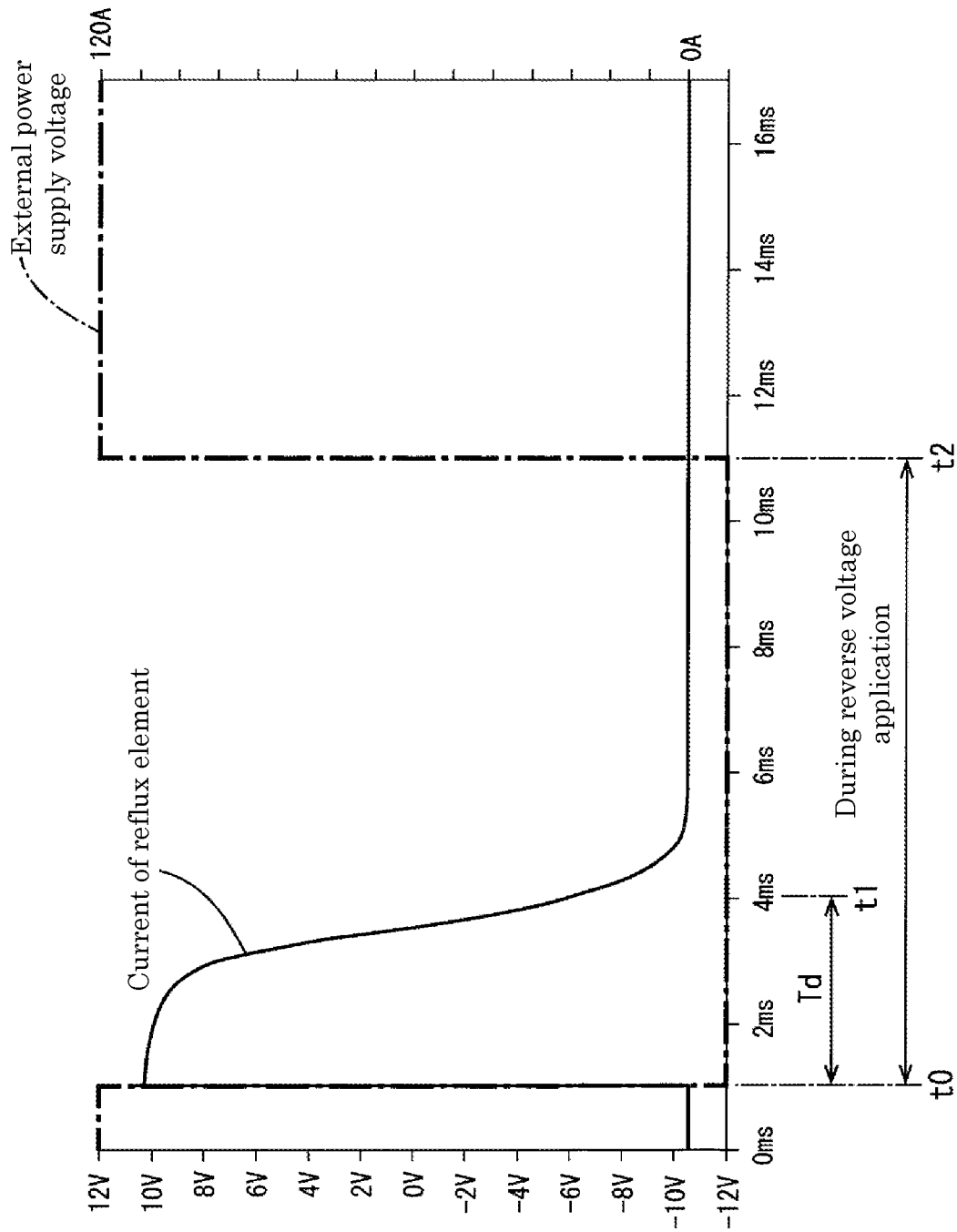
FIG. 9 is a current waveform when a voltage of the external power supply is changed from positive to negative.

FIG. 9 illustrates a current waveform of the reflux element when the voltage at the external power supply 150 is changed from positive to negative. At the time to, the voltage at the external power supply 150 is switched from positive to negative, and after the time t0, the reverse voltage (negative voltage) is applied to the external terminals 58A, 58B.

When the delay time Td elapses after the reverse voltage is applied at the time t0, the switching circuit 120 switches the semiconductor switch 115 from on to off.

Consequently, after the application of the reverse voltage, the current flowing through the reflux element 111 is cut off when the delay time Td elapses, and then, the current I does not flow through the reflux element 111 even when the reverse voltage is continuously applied. From the above, the breakdown of the reflux element 111 due to the abnormal heat generation can be prevented.

The delay time Td is preferably set within a range in which a temperature of the reflux element 111 does not exceed the rated temperature (limit temperature) by the current I flowing during the reverse connection.

When the external power supply 150 is switched from negative to positive at a time t2, the state returns to the state of FIG. 5, the source S of the semiconductor switch 115 becomes the reference voltage (0 V), and the gate G becomes the battery voltage (12 V) of the assembled battery 21. Thus, Vgs exceeds Vth, and the semiconductor switch 115 automatically returns from off to on.

5. Effect

In this configuration, the induced current I generated when the discharge current to the load 12 is cut off is returned to the load 12 using the reflux circuit 110. Consequently, the energy storage apparatus 20 can be protected from the induced current (surge).

In the case where the external power supply 150 or the charger is reversely connected, the semiconductor switch 115 is switched from on to off when a predetermined time (delay time Td) elapses from the reverse connection. Consequently, even when the reverse connection is generated, the current I is cut off after the delay time elapses, so that the breakdown of the reflux element 111 due to the abnormal heat generation can be prevented.

In this configuration, because the delay is performed using the timing delay circuit 130 that switches the semiconductor switch 115 from on to off, it is more resistant to noise and less likely to cause a malfunction as compared with the case where the delay is performed using a controller such as a microcomputer. Consequently, the current of the reflux element 111 can be reliably cut off after the delay time elapses.

Other Embodiments

The present invention is not limited to the embodiment described with reference to the above description and the drawings. For example, the following embodiments are also included in the technical scope of the present invention.

(1) In the above embodiment, the battery cell 22 is illustrated as an example of the energy storage device. The energy storage device is not limited to the battery cell 22, but may be a capacitor. The battery cell 22 is not limited to the lithium ion secondary battery, but may be another nonaqueous electrolyte secondary battery. A lead-acid battery or the like can also be used. The energy storage devices are not limited to the case where the plurality of energy storage devices are connected in series and parallel, but may be connected in series or have a configuration of a single cell.

(2) In the above embodiment, the energy storage apparatus 20 is used for starting the engine. The use application of the energy storage apparatus 20 is not limited to a specific application. The energy storage apparatus 20 may be used in various applications such as a mobile object (for vehicles, ships, automated guided vehicles (AGV), and the like) and an industrial application (an energy storage apparatus of an uninterruptible power supply system or a solar power generating system). The load is not limited to the starter 12, but various loads (various motors and the like) such as a vehicle can be used.

(3) In the above embodiment, the energy storage apparatus 20 has been described as the motorcycle, but the present invention is not limited thereto. For example, the energy storage apparatus may be an energy storage apparatus for a vehicle such as an electric vehicle or a hybrid vehicle.

(4) In the above embodiment, the current cutoff unit that cuts off the current of the reflux element 111 is configured of the semiconductor switch 115. The current cutoff unit may use a contact switch such as a relay instead of the semiconductor switch 115.

(5) In the above embodiment, the capacitor 125 is the capacitance unit existing between the gate and the source of the semiconductor switch 115. The capacitance unit may be a stray capacitance between the gate and the source of the semiconductor switch 115 instead of the capacitor 125.

(6) In the above embodiment, the delay circuit 130 is the RC delay circuit including the first resistor 121 and the capacitor 125. The delay circuit 130 only needs to be able to delay the timing of switching the semiconductor switch 115 from on to off by a predetermined time from the time when the reverse voltage is applied to the external terminals, and may delay the timing of switching the semiconductor switch 115 using, for example, a timer or the like. The timing may be delayed using a microcomputer. When the timer or the microcomputer is used, the reverse voltage may be detected by a detection circuit, and the timing of switching the semiconductor switch 115 may be delayed using the detection of the detection circuit as a trigger. The detection circuit may detect the application of the reverse voltage from the voltage of the external terminals, or detect the reverse voltage by another method.

(7) In the above embodiment, the diode has been exemplified as an example of the reflux element 111. The reflux element 111 may be an element other than the diode as long as the element has a rectifying action (blocking the reverse direction) in which the direction from the power line PL2 of the negative electrode toward the power line PL1 of the positive electrode is the forward direction.

The invention claimed is:

1. A protective circuit of an energy storage apparatus including external terminals, the protective circuit comprising:
a reflux circuit connected in parallel to a load connected between the external terminals; and
a switching circuit,
wherein the reflux circuit includes:
a reflux element that refluxes an induced current, which is generated when current to the load is cut off, to the load; and
a current cutoff unit connected in series to the reflux element, the current cutoff unit being a semiconductor switch,
wherein the switching circuit:
switches the semiconductor switch from on to off while delaying the semiconductor switch by a predetermined time from a time point when a reverse voltage is applied to the external terminals,
includes a capacitance unit existing between a gate and a source of the semiconductor switch, the capacitance unit being discharged from the time point when the reverse voltage is applied to the external terminals to switch the semiconductor switch from on to off while delayed by the predetermined time from the time point when the reverse voltage is applied, and
includes a first resistor, a diode connected in parallel to the capacitance unit, and a second resistor,
wherein:
in the first resistor, one end is connected to the external terminal of a positive electrode and the other end is connected to the gate of the semiconductor switch, and wherein, in the capacitance unit and the diode, one end is connected to the source of the semiconductor switch and the other is connected to the gate of the semiconductor switch, and
in the second resistor, one end is connected to the external terminal of the negative electrode and the other end is connected to the source of the semiconductor switch.

2. An energy storage apparatus comprising:
an energy storage device; and
a protective circuit comprising:
a reflux circuit connected in parallel to a load connected between the external terminals; and
a switching circuit,
wherein the reflux circuit includes:
a reflux element that refluxes an induced current, which is generated when current to the load is cut off, to the load; and
a current cutoff unit connected in series to the reflux element, the current cutoff unit being a semiconductor switch,
wherein the switching circuit:
switches the semiconductor switch from on to off while delaying the semiconductor switch by a predetermined time from a time point when a reverse voltage is applied to the external terminals,
includes a capacitance unit existing between a gate and a source of the semiconductor switch, the capacitance unit being discharged from the time point when the reverse voltage is applied to the external terminals to switch the semiconductor switch from on to off while delayed by the predetermined time from the time point when the reverse voltage is applied, and
includes a first resistor, a diode connected in parallel to the capacitance unit, and a second resistor,
wherein:
in the first resistor, one end is connected to the external terminal of a positive electrode and the other end is connected to the gate of the semiconductor switch, and wherein, in the capacitance unit and the diode, one end is connected to the source of the semiconductor switch and the other is connected to the gate of the semiconductor switch, and
in the second resistor, one end is connected to the external terminal of the negative electrode and the other end is connected to the source of the semiconductor switch.

* * * * *